US00RE35216E

United States Patent [19]

Anderson et al.

[11] E Patent Number: Re. 35,216

[45] Reissued Date of Patent: Apr. 23, 1996

[54] SCROLL MACHINE WITH FLOATING SEAL

[75] Inventors: Gary J. Anderson, Sidney, Ohio; James W. Bush, Skaneateles, N.Y.

[73] Assignee: Copeland Corporation, Sidney, Ohio

[21] Appl. No.: 237,857

[22] Filed: May 4, 1994

Related U.S. Patent Documents

Reissue of:

[64] Patent No.: 5,156,539
Issued: Oct. 20, 1992
Appl. No.: 841,251
Filed: Feb. 24, 1992

U.S. Applications:

[63] Continuation of Ser. No. 591,454, Oct. 1, 1990, abandoned.

[51] Int. Cl.[6] ..... F01C 1/04; F01C 19/00; F16J 15/12; F04B 49/02

[52] U.S. Cl. ..... 417/310; 418/55.4; 418/55.5; 418/57; 277/37; 277/38; 277/47; 277/81 R

[58] Field of Search ..... 417/310; 418/55.4, 418/55.5, 57; 277/35, 37, 38, 47, 81 R, 85, 152

[56] References Cited

U.S. PATENT DOCUMENTS

| | | | |
|---|---|---|---|
| 2,294,105 | 8/1942 | Walgren | 277/85 |
| 2,867,462 | 1/1959 | Nielsen | 277/152 |
| 3,306,683 | 2/1967 | Deuring . | |
| 3,511,512 | 5/1970 | Wheelock | 277/47 |
| 3,600,114 | 8/1971 | Dvorak et al. | 418/55.5 |
| 3,707,852 | 1/1973 | Burckhardt et al. . | |
| 4,116,452 | 9/1978 | Schanz . | |
| 4,642,034 | 2/1987 | Terauchi | 417/295 |
| 4,645,437 | 2/1987 | Sakashita et al. | 418/57 |
| 4,655,462 | 4/1987 | Balsells . | |
| 4,669,737 | 6/1987 | Diffenderfer | 277/152 |
| 4,717,314 | 1/1988 | Sato et al. | 417/310 |
| 4,840,545 | 6/1989 | Moilanen | 417/310 |
| 4,869,514 | 9/1989 | Bogdanovic | 277/152 |
| 4,877,382 | 10/1989 | Caillat et al. | 418/55.5 |
| 4,940,080 | 7/1990 | Reeves et al. | 277/81 R |
| 4,993,928 | 2/1991 | Fraser, Jr. | 418/55.5 |

FOREIGN PATENT DOCUMENTS

| | | | |
|---|---|---|---|
| 60-224989 | 11/1985 | Japan | 418/55.5 |

OTHER PUBLICATIONS

Catalog of American Veriseal entitled "VARILIP–Radial Turcite Lip Seals for Rotating Shafts", 1987.

*Primary Examiner*—John J. Vrablik
*Attorney, Agent, or Firm*—Harness, Dickey

[57] ABSTRACT

A scroll machine utilizing working fluid under pressure to enhance axial sealing, including several embodiments of a multi-function floating seal to isolate the axial biasing fluid, and provide vacuum protection and a degree of high pressure ratio protection.

66 Claims, 6 Drawing Sheets

SCROLL MACHINE WITH FLOATING SEAL

Matter enclosed in heavy brackets [ ] appears in the original patent but forms no part of this reissue specification; matter printed in italics indicates the additions made by reissue.

This is a continuation of U.S. patent application Ser. No. 591,454, filed Oct. 1, 1990, now abandoned.

The present invention relates to seals for scroll-type machinery, and more particularly to a multi-function floating seal for axially compliant scroll compressors.

BACKGROUND AND SUMMARY OF THE INVENTION

A typical scroll machine has an orbiting scroll member having a spiral wrap on one face thereof, a non-orbiting scroll member having a spiral wrap on one face thereof, said wraps being intermeshed with one another, and means for causing said orbiting scroll member to orbit about an axis with respect to said non-orbiting scroll member, whereby said wraps will create pockets of progressively changing volume.

To maximize efficiency, it is important for the wrap tips of each scroll member to sealingly engage the end plate of the other scroll member so that there is minimum leakage therebetween. One way this has been accomplished, other than by using tip seals (which are very difficult to assemble and which often present reliability problems) is by using fluid under pressure to axially bias one of the scroll members against the other scroll member. This, of course, requires seals in order to isolate the biasing fluid at the desired pressure. Accordingly, there is a continuing need in the field of scroll machines for improved axial biasing techniques including improved seals to facilitate same.

The seals of the present invention are embodied in a compressor and suited for use in machines which use discharge pressure alone, discharge and an independent intermediate pressure, or solely an intermediate pressure only, in order to provide the necessary axial biasing forces to enhance tip sealing. In addition, the seals of the present invention, which in most embodiments are three seals in one, are suitable particularly for use in applications which bias the non-orbiting scroll.

It is therefore one of the primary objects of the present invention to provide an improved seal which is relatively simple in construction, easy to install and inspect, and which effectively provides the complex sealing functions desired. The seals of the present invention provide significant additional advantages. For example, the seal has been discovered to be particularly sensitive to the pressure ratio of the scroll machine and consequently provides particularly good protection against vacuum conditions such as caused by reverse rotation or a blocked suction condition. In this condition, the seal will become ineffective and thus permit discharge gas to be bypassed directly into a zone of suction gas at suction gas pressure. This prevents the creation of a high vacuum on the inlet side of the compressor which might otherwise occur and which could cause excessive and damaging forces pulling the scroll members together. Even more importantly, it prevents the arcing or burning of the motor protector connector pins which has been observed to occur under some vacuum conditions.

The seals of the present invention also, in some applications, provide a degree of temperature protection, particularly in motor-compressors where suction gas is used to cool the motor. This is because the seal will leak from the high side to the low side at pressure differentials which are significantly higher than those for which the machine was designed. This leakage of discharge fluid to the suction side of the compressor will cause the machine to have a reduced output and the resulting heat build-up within the compressor enclosure due to the reduced flow of cooling gas will cause the standard motor protector to trip and shut the machine down. This characteristic of the seals of the present invention therefore provides a degree of protection in certain applications from excessive discharge temperatures which could result from loss of working fluid charge, or from a blocked condensor fan in a refrigeration system, or from an excessive discharge pressure (for whatever reason). All of these undesirable conditions will cause a scroll machine to function at a pressure ratio greater than that which is designed into the machine in terms of its predetermined fixed volume ratio.

These and other advantages of the present invention will become more apparent when viewed in light of the accompanying drawings and following detailed description.

BRIEF DESCRIPTION OF THE DRAWING FIGURES

DETAILED DESCRIPTION OF THE PREFERRED EMBODIMENTS

Figure 1:
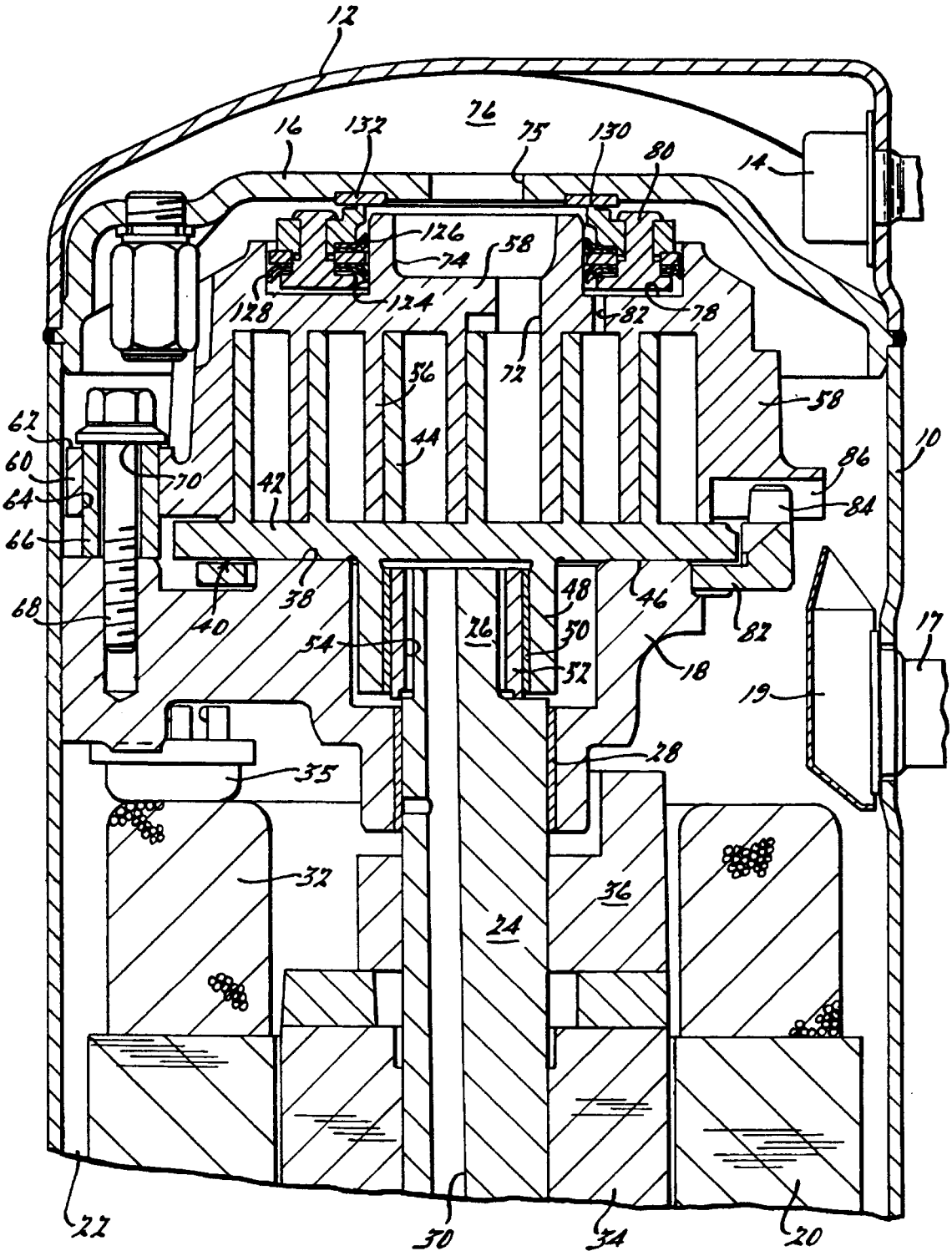
FIG. 1 is a partial vertical sectional view through a scroll machine in which fluid pressure is used to bias the non-orbiting scroll member axially against the orbiting scroll member, and which embodies the principles of the present invention.

While the present invention is suitable for incorporation in many different types of scroll machines, for exemplary purposes it will be described herein incorporated in a scroll refrigerant compressor of the general structure illustrated in vertical section in FIG. 1. Generally speaking, the compressor comprises a cylindrical hermetic shell 10 having welded at the upper end thereof a cap 12, which is provided with a refrigerant discharge fitting 14 optionally having the usual discharge valve therein (not shown). Other elements affixed to the shell include a transversely extending partition 16 which is welded about its periphery at the same point that cap 12 is welded to shell 10, a main bearing housing 18 which is affixed to shell 10 at a plurality of points in any desirable manner, and a suction gas inlet fitting 17 having a gas deflector 19 disposed in communication therewith inside the shell.

A motor stator 20 which is generally square in cross-section but with the comers rounded off is press fit into shell 10. The flats between the rounded comers on the stator provide passageways between the stator and shell, indicated at 22, which facilitate the flow of lubricant from the top of the shell to the bottom. A crankshaft 24 having an eccentric crank pin 26 at the upper end thereof is rotatably journaled in a bearing 28 in main beating housing 18 and a second beating in a lower bearing housing (not shown). Crankshaft 24 has at the lower end the usual relatively large diameter oil-pumping concentric bore (not shown) which communicates with a radially outwardly inclined smaller diameter bore 30 extending upwardly therefrom to the top of the crankshaft. The lower portion of the interior shell 10 is filled with lubricating oil in the usual manner and the pump at the bottom of the crankshaft is the primary pump acting in conjunction with bore 30, which acts as a secondary pump, to pump lubricating fluid to all of the various portions of the compressor which require lubrication.

Crankshaft 24 is rotatively driven by an electric motor including stator 20, windings 32 passing therethrough, and a rotor 34 press fit on the crankshaft and having one or more counterweights 36. A motor protector 35, of the usual type, is provided in close proximity to motor windings 32 so that if the motor exceeds its normal temperature range the protector will deenergize the motor.

The upper surface of main bearing housing 18 is provided with an annular flat thrust bearing surface 38 on which is disposed an orbiting scroll member 40 comprising an end plate 42 having the usual spiral vane or wrap 44 on the upper surface thereof, an annular flat thrust surface 46 on the lower surface, and projecting downwardly therefrom a cylindrical hub 48 having a journal bearing 50 therein and in which is rotatively disposed a drive bushing 52 having an inner bore 54 in which crank pin 26 is drivingly disposed. Crank pin 26 has a flat on one surface (not shown) which drivingly engages a flat surface in a portion of bore 54 (not shown) to provide a radially compliant driving arrangement, such as shown in assignee's U.S. Pat. No. 4,877,382, the disclosure of which is herein incorporated by reference.

Wrap 44 meshes with a non-orbiting spiral wrap 56 forming a part of non-orbiting scroll member 58 which is mounted to main bearing housing 18 in any desired manner which will provide limited axial movement of scroll member 58. The specific manner of such mounting is not critical to the present invention, however, in the present embodiment, for exemplary purposes, non-orbiting scroll member 58 has a plurality of circumferentially spaced mounting bosses 60, one of which is shown, each having a flat upper surface 62 and an axial bore 64 in which is slidably disposed a sleeve 66 which is bolted to main bearing housing 18 by a bolt 68 in the manner shown. Bolt 68 has an enlarged head having a flat lower surface 70 which engages surface 62 to limit the axially upper or separating movement of non-orbiting scroll member, movement in the opposite direction being limited by axial engagement of the lower tip surface of wrap 56 and the flat upper surface of orbiting scroll member 40.

Non-orbiting scroll member 58 has a centrally disposed discharge passageway 72 communicating with an upwardly open recess 74 which is in fluid communication via an opening 75 in partition 16 with the discharge muffler chamber 76 defined by cap 12 and partition 16. Non-orbiting scroll member 58 has in the upper surface thereof an annular recess 78 having parallel coaxial side walls in which is sealingly disposed for relative axial movement an annular floating seal 80 which serves to isolate the bottom of recess 78 from the presence of gas under suction and discharge pressure so that it can be placed in fluid communication with a source of intermediate fluid pressure by means of a passageway 82. The non-orbiting scroll member is thus axially biased against the orbiting scroll member by the forces created by discharge pressure acting on the central portion of scroll member 58 and those created by intermediate fluid pressure acting on the bottom of recess 78. This axial pressure biasing, as well as various techniques for supporting scroll member 58 for limited axial movement, are disclosed in much greater detail in assignee's aforesaid U.S. Pat. No. 4,877,382.

Relative rotation of the scroll members is prevented by the usual Oldham coupling comprising a ring 82 having a first pair of keys 84 (one of which is shown) slidably disposed in diametrically opposed slots 86 (one of which is shown) in scroll member 58 and a second pair of keys (not shown) slidably disposed in diametrically opposed slots (not shown) in scroll member 40.

The compressor is preferably of the "low side" type in which suction gas entering via deflector 19 is allowed, in part, to escape into the shell and assist in cooling the motor. So long as there is an adequate flow of returning suction gas the motor will remain within desired temperature limits. When this flow ceases, however, the loss of cooling will cause motor protector 35 to trip and shut the machine down.

The scroll compressor as thus far broadly described is either now known in the art or is the subject matter of other pending applications for patent by applicants' assignee. The details of construction which incorporate the principles of the present invention are those which deal with several embodiments of a novel multi-function floating seal.

With reference to FIGS. 1–5, the floating seal of the first embodiment is of a coaxial sandwiched construction and comprises an annular base plate 100, east out of aluminum or the like, having a plurality of equally spaced upstanding integral projections 102 each having an enlarged base portion 104. Disposed on plate 100 is an annular gasket 106 formed of epoxy coated fiber gasket material having a plurality of equally spaced holes which receive base portions 104, on top of which is disposed a pair of normally flat identical lower lip seals 108 formed of glass filled PTFE (approximately 5%) and optionally including 5% $MoS_2$ by weight. Seals 108 have a plurality of equally spaced holes which receive base portions 104. On top of seals 108 is disposed an annular spacer plate 110, which can be a simple steel stamping, having annular recesses 112 and 114 on the top and bottom surfaces thereof and a plurality of equally spaced holes 119 which receive base portions 104, and on top of plate 110 are a pair of normally flat identical annular upper lip seals 116 formed of the same material as lip seals 108 and maintained in coaxial position by means of an annular upper seal plate 118 having a plurality of equally spaced holes receiving projections 102 and an annular rim 120 disposed in recess 112. Seal plate 118, which may be formed of grey east iron, has disposed about the inner periphery thereof an upwardly projecting planar sealing lip 122. The assembly is secured together by swaging the ends of each of the projections 101, as indicated at 123.

The overall seal assembly therefore provides three distinct seals; namely, an inside diameter seal at 124 and 126, an outside diameter seal at 128 and a top seal at 130, as best seen in FIG. 1. Seal 124 is between the inner periphery of lip seals 108 and the inside wall of recess 78, and seal 126 is between the inner periphery of lip seals 116 and the inside wall of recess 78. Seals 124 and 126 isolate fluid under intermediate pressure in the bottom of recess 78 from fluid under discharge pressure in recess 74. Seal 128 is between the outer periphery of lip seals 108 and the outer wall of recess 78, and isolates fluid under intermediate pressure in the bottom of recess 78 from fluid at suction pressure within shell 10. Seal 130 is between lip seal 122 and an annular wear ring 132 formed of cast iron or the like and affixed to partition 16 by a suitable adhesive in a position surrounding opening 75, and isolates fluid at suction pressure from fluid at discharge pressure across the top of the seal assembly. In lieu of a separate wear ring 132 for the upper seal the lower surface of partition 16 surrounding opening 75 can be locally hardened, by nitriding, carbonitriding or the like.

The diameter of seal 130 is chosen so that there is a positive upward sealing force on seal 80 under normal operating conditions, i.e., at normal pressure differentials. Therefore, when excessive pressure differentials are encountered, the seal will be forced downwardly by discharge pressure, thereby permitting a leak of high side discharge gas directly across the seal to a zone of low side suction gas. If this leakage is great enough then the resultant loss of flow of motor-cooling suction gas (aggravated by the excessive temperature of the leaking discharge gas) will cause the motor protector to trip, thereby deenergizing the motor. The width of seal 130 is chosen so that the unit pressure on the seal itself (i.e., between seal 122 and seat 132) is greater than normally encountered discharge pressure, thus insuring consistant sealing.

With reference to FIGS. 4–7, the floating seal of the second embodiment is also of a coaxial sandwiched construction and comprises an annular base plate 200, cast out of aluminum or the like and having an annular upstanding integral rib 202. Disposed on plate 200 is a lower inner lip seal 204 formed of 5% glass and 5% molydisulfide filled PTFE and having a conical resilient sealing lip 206; and an outer lip seal 208 of the same material having a resilient conical sealing lip 210. Disposed on top of inner seal 204 and inside rib 202 is an annular metal separator plate 212 having minutely ribbed upper and lower surfaces 212a and 212b to increase mechanical contact with the seals. On top of plate 212 are a pair of identical annular upper lip seals 214 formed of the same material as lip seals 204 and 208, also maintained in coaxial position by means of an annular rib 202, and an upper seal plate 216 having disposed about the inner periphery thereof an upwardly projecting planar sealing lip 218. Seals 214 have resilient conical inner sealing lips 220. Seal plate 216 is preferably formed of cast iron. Outer seal 208 is retained in place by an annular metal ring 222, and the entire assembly is secured together by swaging the top of rib 202 at spaced locations, as indicated at 224.

Figure 4:
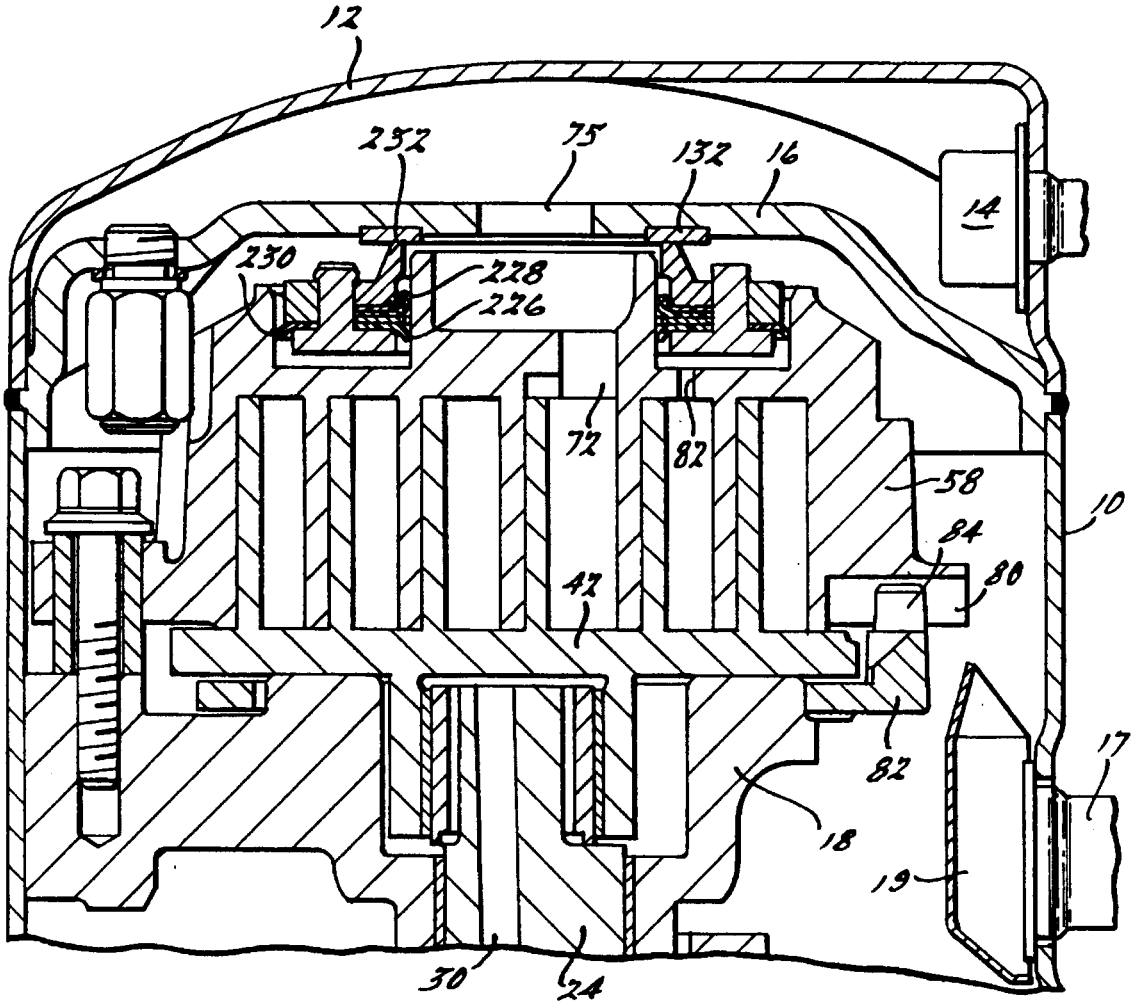
FIG. 4 is a view similar to FIG. 1 showing a second embodiment of the floating seal of the present invention.
Figure 5:
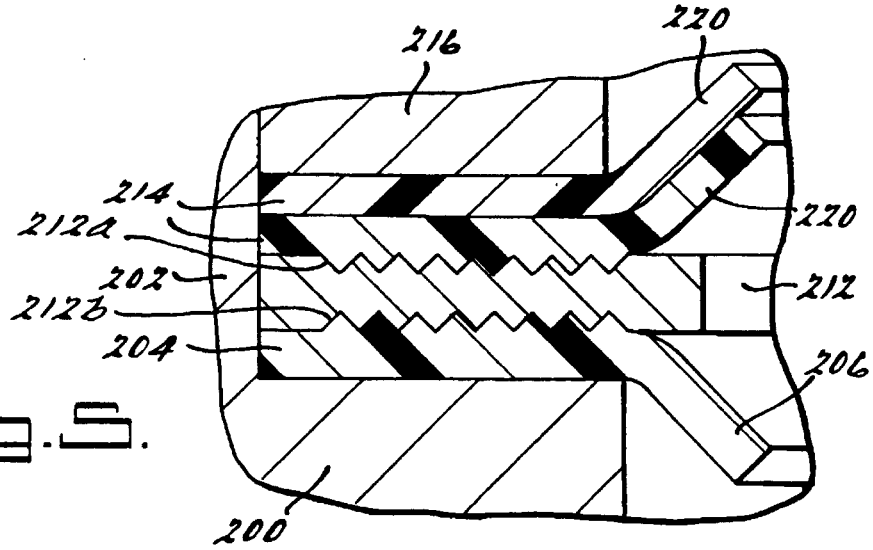
FIG. 5 is an enlarged vertical sectional view of a portion of the seal shown in FIG. 4.
Figure 6:
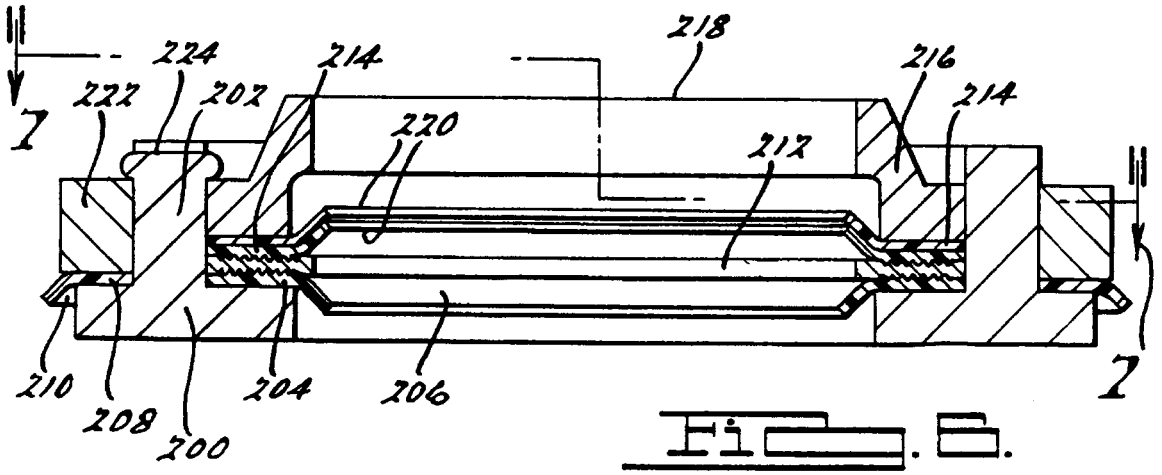
FIG. 6 is an enlarged vertical sectional view of the floating seal of the embodiment of FIG. 4, shown in its relaxed state.
Figure 7:
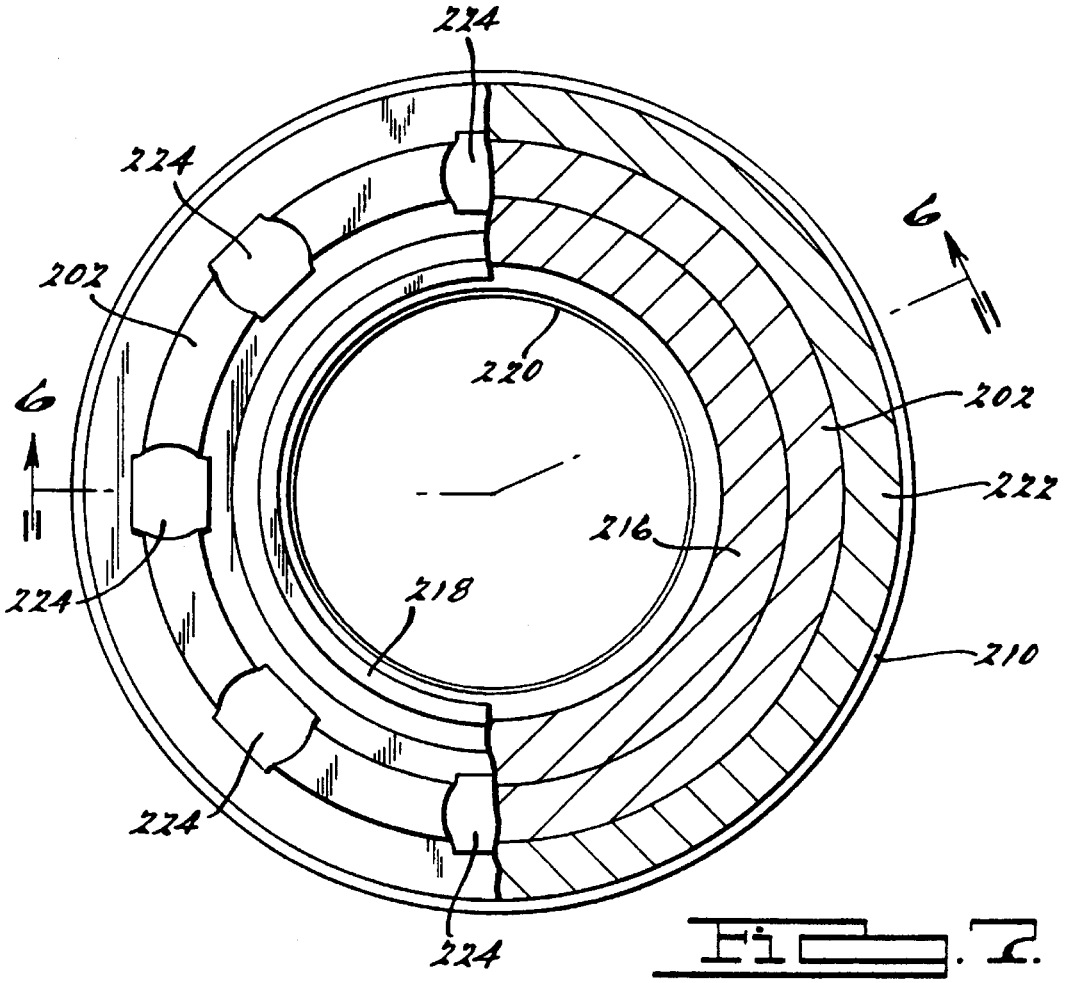
FIG. 7 is a sectional view taken along line 7—7 in FIG. 6 and having line 6—6 showing where the section of FIG. 6 is taken.

This seal assembly also provides three distinct seals; namely, an inside diameter seal at 226 and 228, an outside diameter seal at 230 and a top seal at 232, as best seen in FIG. 4. Seal 226 is between the inner periphery of lip seal 204 and the inside wall of recess 78, and seal 228 is between the inner periphery of lip seals 214 and the inside wall of recess 78. Seals 226 and 228 isolate fluid under intermediate pressure in the bottom of recess 78 from fluid under discharge pressure in recess 74. Seal 230 is between the outer periphery of lip seal 208 and the outer wall of recess 78, and isolates fluid under intermediate pressure in the bottom of recess 78 from fluid at suction pressure within shell 10. Seal 232 is between lip seal 218 and annular wear ring 132 surrounding opening 75 in partition 16, and isolates fluid at suction pressure from fluid at discharge pressure across the top of the seal assembly. The diameter and width of the top seal are chosen in the same manner as for the fast embodiment.

Figure 8:
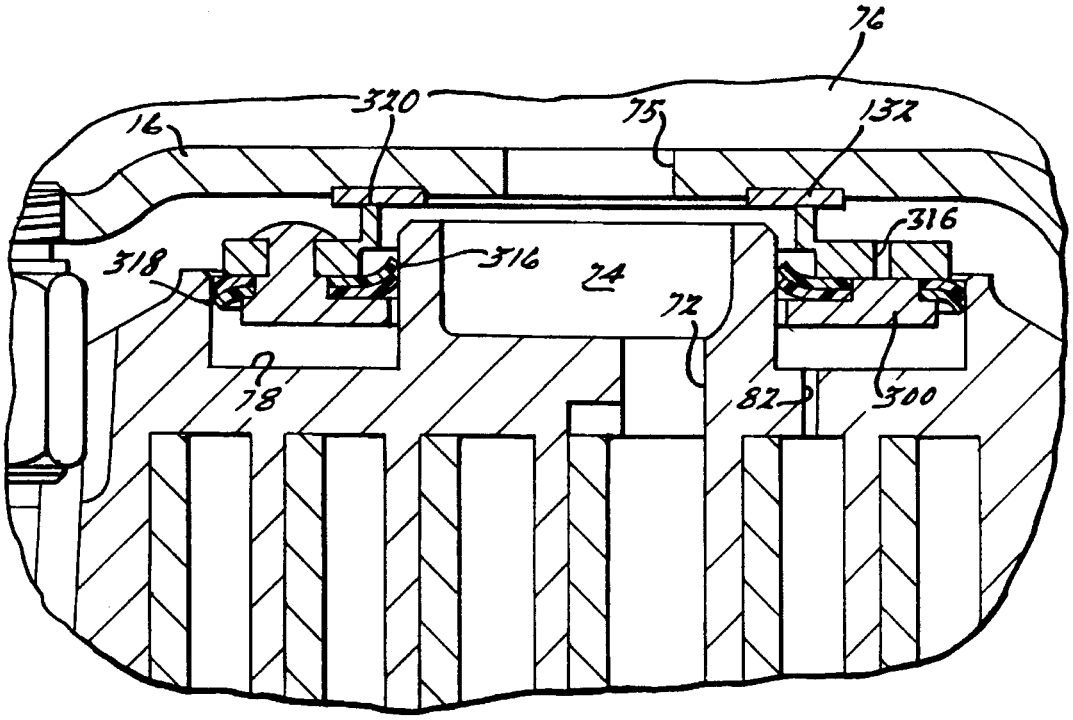
FIG. 8 is a fragmentary view similar to FIG. 1 showing a third embodiment of the floating seal of the present invention.
Figure 9:
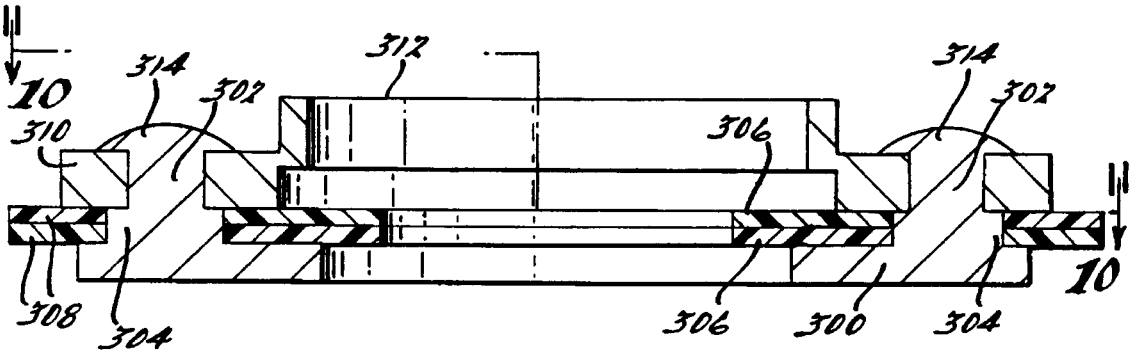
FIG. 9 is an enlarged vertical cross-sectional view of the floating seal of FIG. 8, shown in its relaxed state.
Figure 10:
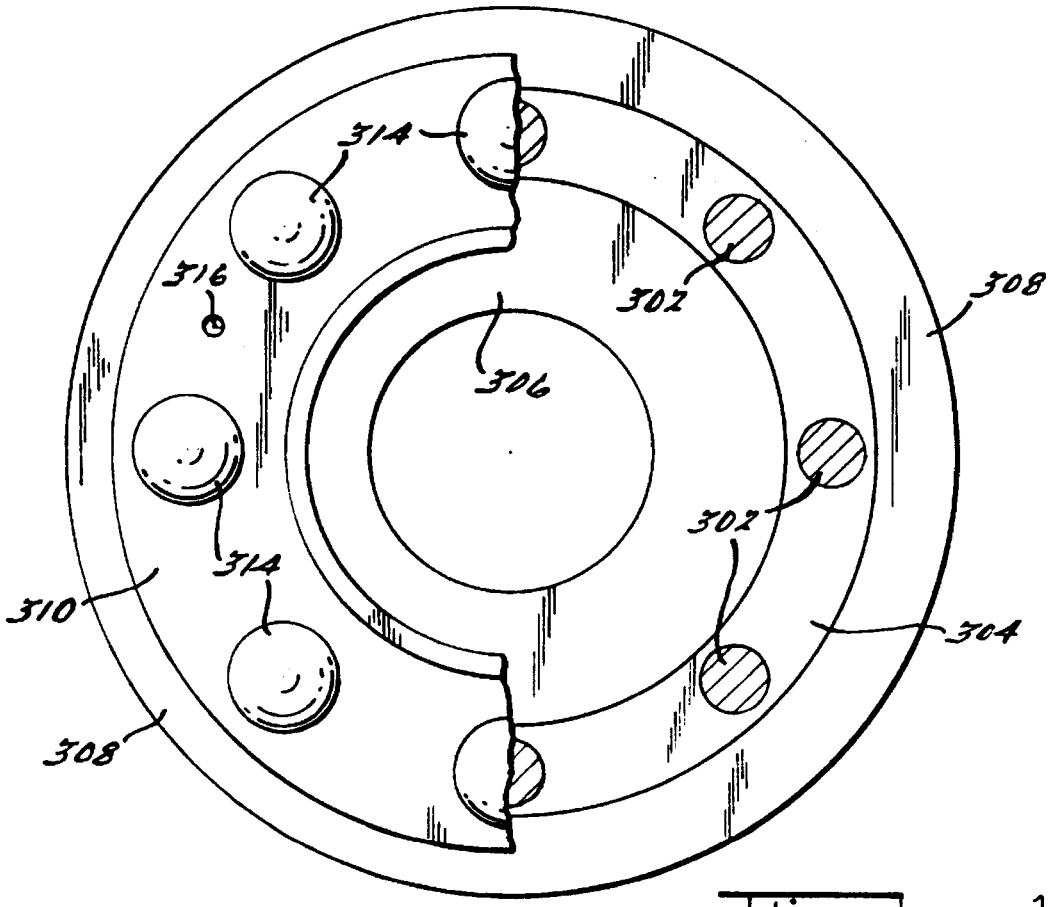
FIG. 10 is a sectional view taken along line 10—10 in FIG. 9

With reference to FIG. 8–10, the floating seal of the third embodiment is also of a coaxial sandwiched construction and comprises an annular base plate 300, cast out of aluminum or the like, having a plurality of equally spaced upstanding integral projections 302 projecting from a shallow annular rib 304. Disposed on the inner periphery of plate 300 inside rib 304 are a pair of normally flat identical inner lip seals 306 formed of suitably filled PTFE. Disposed on top of the outer periphery of plate 300, outside rib 304, are a pair of normally flat identical annular outer lip seals 308 formed of the same material as lip seals 306. Both pairs of seals are maintained in coaxial position by means of rib 304, and are clamped in place by an annular upper seal plate 310 having a plurality of equally spaced holes receiving projections 302. Seal plate 310, which is preferably formed of grey cast iron, stamped steel or powdered metal, has disposed about the inner periphery thereof an upwardly projecting planar sealing lip 312. The assembly is secured together by swaging the ends of each of the projections 302, as indicated at 314.

Again, the overall seal assembly therefor provides three distinct seals; namely, an inside diameter seal at 316, an outside diameter seal at 318 and a top seal at 320, as best seen in FIG. 8. Seal 316 is between the inner periphery of lip seals 306 and the inside wall of recess 78. Seal 316 isolates fluid under intermediate pressure in the bottom of recess 78 from fluid under discharge pressure in recess 74. Seal 318 is between the outer periphery of lip seals 308 and the outer wall of recess 78, and isolates fluid under intermediate pressure in the bottom of recess 78 from fluid at suction pressure within shell 10. Seal 320 is between lip seal 312 and annular wear ring 132 surrounding opening 75 in partition 16, and isolates fluid at suction pressure from fluid at discharge pressure across the top of the seal assembly. The diameter and width of the top seal are chosen in the same manner as for the first embodiment.

Figure 2:
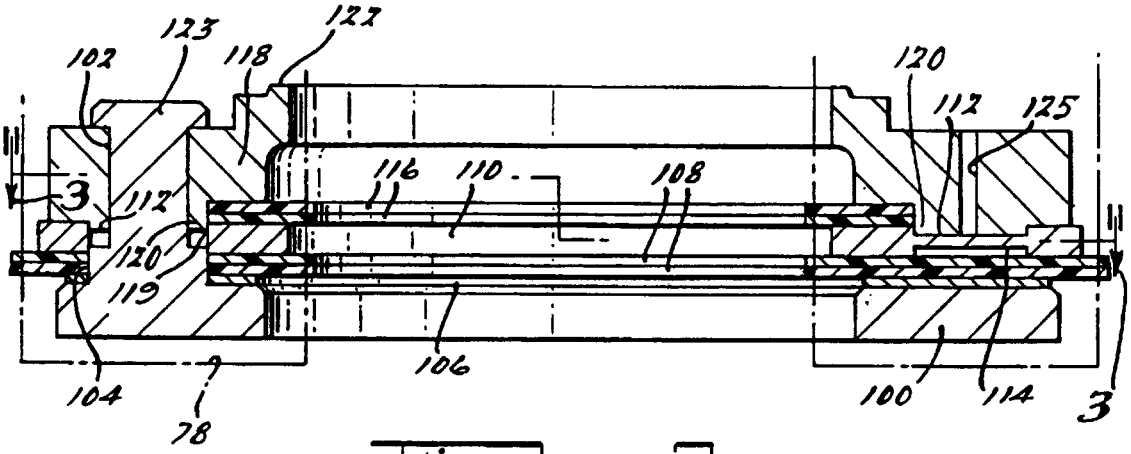
FIG. 2 is an enlarged vertical sectional view of a floating seal forming a part of the FIG. 1 fast embodiment of the invention, shown in its relaxed state.
Figure 3:
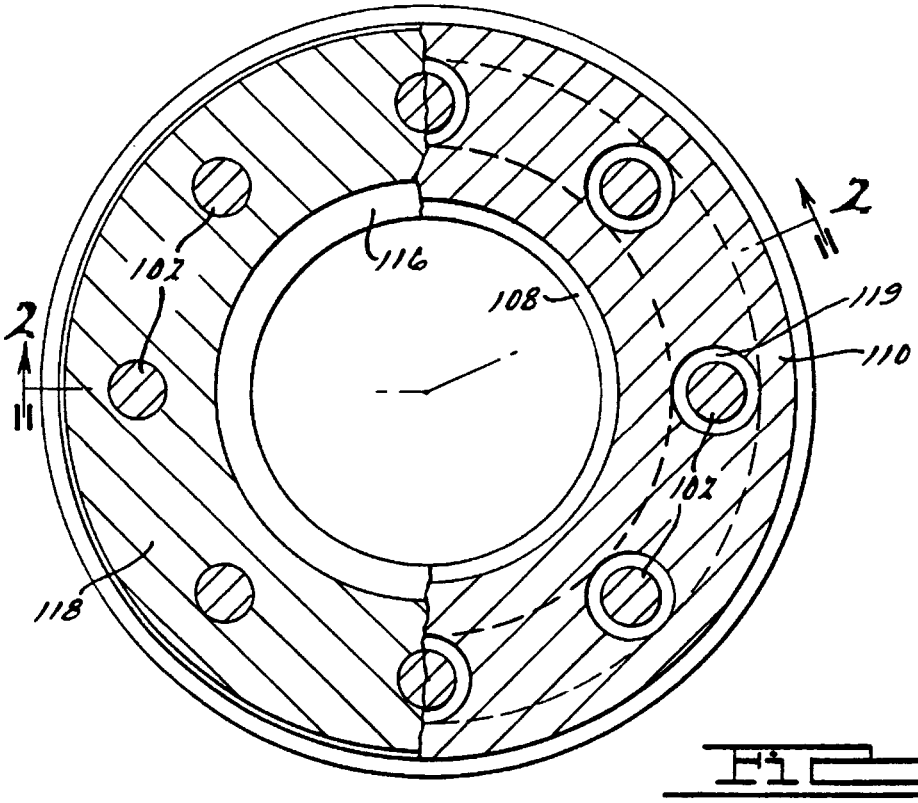
FIG. 3 is a sectional view taken along line 3—3 of FIG. 2 and having line 2—2 showing where the section of FIG. 2 is taken.

In order to prevent excessive intermediate pressure from building up between the inner and outer seals, which would occur in a liquid slugging situation and could blow out the high side seal, a suitable vent can be provided, such as at 123 in FIG. 2 and at 316 in FIG. 8.

While this invention has been described in connection with these particular examples, no limitation is intended except as defined by the following claims. The skilled practitioner will realize that other modifications may be made without departing from the spirit of this invention after studying the specification and drawings.

We claim:

1. A scroll machine comprising:

(a) a hermetic shell;

(b) an orbiting scroll member disposed in said shell and having a first spiral wrap on one face thereof;

(c) a non-orbiting scroll member disposed in said shell and having a second spiral wrap on one face thereof, said wraps being intermeshed with one another;

(d) means for causing said orbiting scroll member to orbit about an axis with respect to said non-orbiting scroll member whereby said wraps will create pockets of progressively changing volume between a suction pressure zone and a discharge pressure zone;

(e) means for mounting one of said scroll members for limited axial movement with respect to the other scroll member;

(f) means defining an annular cavity exposed to a surface of one of said scroll members which will cause pressurized fluid in said cavity to bias said one scroll member toward the other scroll member, said cavity having a radially inner wall surface and a radially outer wall surface;

(g) means defining a fluid leakage path between said cavity and the interior of said shell;

(h) means for supplying fluid under pressure to said cavity for biasing said scroll members axially together; and (i) annular seal means disposed in said cavity, said seal means having first and second seals sealingly engaging said inner and outer wall surfaces, respectively, to isolate said pressurized fluid in said cavity from said leakage path and said discharge pressure zone.

2. A scroll machine as claimed in claim 1 wherein said inner and outer wall surfaces are cylindrical and coaxial.

3. A scroll machine as claimed in claim 1 wherein said machine is a compressor and said pressurized fluid is the working fluid being compressed from a suction pressure to a discharge pressure.

4. A scroll machine as claimed in claim 3 wherein said pressurized fluid is at a pressure intermediate said suction pressure and discharge pressure.

5. A scroll machine as claimed in claim 1 wherein said seal means floats axially in said cavity.

6. A scroll machine as claimed in claim 1 wherein said seal means is of sandwich construction comprising a first annular element and a second annular element, and wherein said first and second seals comprise generally flat inner and outer annular lip seals clamped between said elements.

7. A scroll machine as claimed in claim 6 wherein said inner and outer lip seals are integral with one another.

8. A scroll machine as claimed in claim 6 wherein said inner and outer lip seals are separate parts.

9. A scroll machine as claimed in claim 6 wherein said lip seals are formed of a filled PTFE material.

10. A scroll machine as claimed in claim 9 wherein said PTFE is filled with glass.

11. A scroll machine as claimed in claim 10 wherein said glass is approximately 5% by weight of the seal material.

12. A scroll machine as claimed in claim 9 wherein said PTFE is filled with $MoS_2$.

13. A scroll machine as claimed in claim 12 wherein said $MoS_2$ is approximately 5% by weight of the seal material.

14. A scroll machine as claimed in claim 6 wherein said lip seals are planar in configuration when in an unstressed state.

15. A scroll machine as claimed in claim 6 wherein said lip seals each having a slightly conical exposed periphery when in an unstressed state.

16. A scroll machine as claimed in claim 15 wherein there are a plurality of inner and outer lip seals.

17. A scroll machine as claimed in claim 6 wherein there are a plurality of inner lip seals having an annular spacer element disposed therebetween.

18. A scroll machine as claimed in claim 17 wherein said spacer element is formed of a relatively rigid material having a plurality of ridges on the portions of its surface which engage said lip seals.

19. A scroll machine as claimed in claim 6 wherein said first element has a plurality of circumferentially spaced axially extending posts extending through said second element.

20. A scroll machine as claimed in claim 19 wherein the free ends of said posts are swedged to clamp said lip seals between said elements.

21. A scroll machine as claimed in claim 19 wherein said lip seals are integral with one another and said post extends therethrough.

22. A scroll machine as claimed in claim 19 wherein said inner and outer lip seals are separate parts and said posts extend therebetween.

23. A scroll machine as claimed in claim 6 wherein there are a plurality of inner lip seals.

24. A scroll machine as claimed in claim 6 wherein said seal means floats axially in said cavity.

25. A scroll machine as claimed in claim 1 wherein said one scroll member is said non-orbiting scroll member.

26. A scroll compressor comprising:

(a) a hermetic shell;

(b) an orbiting scroll member disposed in said shell and having a first spiral wrap on one face thereof;

(c) a non-orbiting scroll member disposed in said shell and having a second spiral wrap on one face thereof, said wraps being intermeshed with one another;

(d) means for causing said orbiting scroll member to orbit about an axis with respect to said non-orbiting scroll member whereby said wraps will create pockets of progressively decreasing volume to compress a fluid from a suction pressure to a discharge pressure;

(e) means for mounting one of said scroll members for limited axial movement with respect to the other scroll member;

(f) means defining a cavity exposed to a surface of one of said scroll members which will cause pressurized fluid in said cavity to bias said one scroll member toward the other scroll member;

(g) means defining a first fluid leakage path between said cavity and a zone in said shell at suction pressure;

(h) means defining a second fluid leakage path between said cavity and a zone in said shell at discharge pressure;

(i) means for supplying fluid to said cavity at a pressure intermediate said suction and discharge pressures for biasing said scroll members axially together; and (j) seal means disposed in said cavity, said seal means having [three seals, said] *a* first seal isolating said pressurized fluid in said cavity from said first leakage path, [said] *a* second seal isolating said cavity from said second leakage path, and [said] *a* third seal [isolating] *engaging a different component of said compressor to isolate* fluid at suction pressure from fluid at discharge pressure across a face of said seal means.

27. A scroll machine as claimed in claim 26 wherein said seal means floats axially in said cavity with said first and second seals remaining effective.

28. A scroll machine as claimed in claim 26 wherein said seal means is of sandwich construction comprising a first annular element and a second annular element, and wherein said first and second seals comprise generally flat inner and outer annular lip seals clamped between said elements.

29. A scroll machine as claimed in claim 28 wherein said inner and outer lip seals are integral with one another.

30. A scroll machine as claimed in claim 28 wherein said inner and outer lip seals are separate parts.

31. A scroll machine as claimed in claim 28 wherein there are a plurality of inner lip seals having an annular spacer element disposed therebetween.

32. A scroll machine as claimed in claim 26 wherein all of said seals are annular in configuration, said third seal being of a diameter which provides a positive net scaling force under normal operating conditions.

33. A scroll machine as claimed in claim 32 wherein said third seal is of a width such that the unit pressure thereon in a sealing direction is greater than normal discharge pressure.

34. A scroll machine as claimed in claim 26 wherein said seal means floats axially in said cavity and wherein the existence of a vacuum at the suction inlet of said compressor will cause said seal means to move axially and render said third seal ineffective.

35. A multi-function seal assembly comprising:

(a) an annular inner lip seal adapted to sealingly engage the outside of a first cylindrical surface;

(b) an annular outer lip seal adapted to sealingly engage the inside of a second cylindrical surface, said seal assembly being mounted for movement along the center axes of said seals;

(c) first and second clamping elements clamping said inner and outer seals therebetween; and (d) a third annular seal operatively associated with one of said elements and being adapted to sealingly engage a generally flat annular sealing surface.

36. A multi-function seal assembly as claimed in claim 35 wherein said three seals are coaxial with one another.

37. A multi-function seal assembly as claimed in claim 35 wherein said first and second cylindrical surfaces define the side walls of an annular cavity, said sealing surface being disposed opposite the bottom of said cavity.

38. A scroll machine comprising:

(a) a hermetic shell;

(b) an orbiting scroll member disposed in said shell and having a first spiral wrap on one face thereof;

(c) a non-orbiting scroll member in said shell and having a second spiral wrap on one face thereof, said wraps being intermeshed with one another;

(d) means for causing said orbiting scroll member to orbit about an axis with respect to said non-orbiting scroll member whereby said wraps will create pockets of progressively changing volume;

(e) means for mounting one of said scroll members for limited axial movement with respect to the other scroll member;

(f) means defining an annular cavity exposed to a surface on one of said scroll members which will cause pressurized fluid in said cavity to bias said one scroll member toward the other scroll member, said cavity having a radial inner wall surface and a radial outer wall surface;

(g) means defining a fluid leakage path between said cavity and the interior of said shell;

(h) means for supplying fluid under pressure to said cavity for biasing said scroll members axially together; and (i) annular seal means disposed in said cavity, said seal means having first and second seals sealingly engaging said inner and outer wall surfaces, respectively, to isolate said pressurized fluid in said cavity from said leakage path, said seal means being of sandwich construction comprising a first annular element having an annular axially extending rib and a second annular element formed of two annular parts disposed on opposite sides of said rib wherein said first and second seals comprise generally flat inner and outer annular lip seals clamped between said elements.

39. A scroll machine comprising:

(a) a hermetic shell;

(b) an orbiting scroll member disposed in said shell and having a first spiral wrap on one face thereof;

(c) a non-orbiting scroll member in said shell and having a second spiral wrap on one face thereof, said wraps being intermeshed with one another;

(d) means for causing said orbiting scroll member to orbit about an axis with respect to said non-orbiting scroll member whereby said wraps will create pockets of progressively changing volume;

(e) means for mounting one of said scroll members for limited axial movement with respect to the other scroll member;

(f) means defining an annular cavity exposed to a surface of one of said scroll members which will cause pressurized fluid in said cavity to bias said one scroll member toward the other scroll member, said cavity having a radially inner wall surface and a radially outer wall surface;

(g) means defining a fluid leakage path between said cavity and the interior of said shell;

(h) means for supplying fluid under pressure to said cavity for biasing said scroll members axially together; and (i) annular seal means disposed in said cavity, said seal means having first and second seals sealingly engaging said inner and outer wall surfaces, respectively, to isolate said pressurized fluid in said cavity from said leakage path, said seal means being of sandwich construction comprising a first annular element having an annular axially extending rib and a second annular element formed of two annular parts disposed on opposite sides of said rib wherein said first and second seals comprise generally flat inner and outer annular lip seals clamped between said elements and wherein said rib is swedged at circumferentially spaced points to clamp said two annular parts and said lip seals between said elements.

40. A scroll compressor comprising:

(a) a hermetic shell;

(b) an orbiting scroll member disposed in said shell and having a first spiral wrap on one face thereof;

(c) a non-orbiting scroll member in said shell and having a second [signal] *spiral* wrap on one face thereof, said wraps being intermeshed with one another;

(d) means for causing said orbiting scroll member to orbit about an axis with respect to said non-orbiting scroll member whereby said wraps will create pockets of progressively changing volume;

(e) means for mounting one of said scroll members for limited axial movement with respect to the other scroll member;

(f) means defining an annular cavity exposed to a surface of one of said scroll members which will cause pressurized fluid in said cavity to bias said one scroll member toward the other scroll member, said cavity having a radially inner wall surface and a radially outer wall surface;

(g) means defining a first fluid leakage path between said cavity and the interior of said shell;

(h) means defining a second fluid leakage path between said cavity and a zone in said shell at discharge pressure;

(i) means for supplying fluid under pressure to said cavity for biasing said scroll members axially together; and (j) annular seal means disposed in said cavity, said seal means having first and second seals sealingly engaging said inner and outer wall surfaces, respectively, to isolate said pressurized fluid in said cavity from said *first and second* leakage [path] *paths*, said seal means being of sandwich construction comprising a first annular element having an annular axially extending rib and a second annular element formed of two annular parts disposed on opposite sides of said rib wherein said first and second seals comprise generally flat inner and outer annular lip seals clamped between said elements;

wherein one face of said seal means is exposed to the fluid in said cavity with said first seal isolating said cavity from said discharge pressure zone and said second seal isolating said cavity from the interior of said shell, the opposite face of said seal means being exposed to both the interior of said shell and to discharge pressure, said seal means [comprising] *engaging another component of said compressor to define* a third annular seal for isolating the interior of said shell from discharge pressure across said opposite face of said seal means.

41. A scroll compressor comprising:

(a) a hermetic shell;

(b) an orbiting scroll member disposed in said shell and having a first spiral wrap on one face thereof;

(c) a non-orbiting scroll member in said shell and having a second spiral wrap on one face thereof, said wraps being intermeshed with one another;

(d) means for causing said orbiting scroll member to orbit about an axis with respect to said non-orbiting scroll member whereby said wraps will create pockets of progressively changing volume;

(e) means for mounting one of said scroll members for limited axial movement with respect to the other scroll member;

(f) means defining an annular cavity exposed to a surface of one of said scroll members which will cause pressurized fluid in said cavity to bias said one scroll member toward the other scroll member, said cavity having a radially inner wall surface and a radially outer wall surface;

(g) means defining a first fluid leakage path between said cavity and the interior of said shell;

(h) means defining a second fluid leakage path between said cavity and a zone in said shell at discharge pressure;

(i) means for supplying fluid under pressure to said cavity for biasing said scroll members axially together; and (j) annular seal means disposed in said cavity, said seal means having first and second seals sealingly engaging said inner and outer wall surfaces, respectively, to isolate said pressurized fluid in said cavity from said *first and second* leakage paths, said seal means being of sandwich construction comprising a first annular element having an annular axially extending rib and a second annular element formed of two annular parts disposed on opposite sides of said rib wherein said first and second seals comprise generally flat inner and outer annular lip seals clamped between said elements;

wherein one face of said seal means is exposed to the fluid in said cavity with said first seal isolating said cavity from said discharge pressure zone and said second seal isolating said cavity from the interior of said shell, the opposite face of said seal means being exposed to both the interior of said shell and to discharge pressure, said seal means [comprising] *engaging another component of said compressor to define* a third annular seal for isolating the interior of said shell from discharge pressure across said opposite face of said seal means and wherein said third seal is integral with said second element of said seal means.

42. A scroll compressor comprising:

(a) a hermetic shell;

(b) a discharge fluid port in a partition disposed in said shell;

(c) an orbiting scroll member disposed in said shell and having a first spiral wrap on one face thereof;

(d) a non-orbiting scroll member in said shell and having a second spiral wrap on one face thereof, said wraps being intermeshed with one another;

(e) means for causing said orbiting scroll member to orbit about an axis with respect to said non-orbiting scroll member whereby said wraps will create pockets of progressively changing volume;

(f) means for mounting one of said scroll members for limited axial movement with respect to the other scroll member;

(g) means defining an annular cavity exposed to a surface of one of said scroll members which will cause pressurized fluid in said cavity to bias said one scroll member toward the other scroll member, said cavity having a radially inner wall surface and a radially outer wall surface;

(h) means defining a first fluid leakage path between said cavity and the interior of said shell;

(i) means defining a second fluid leakage path between said cavity and a zone in said shell at discharge pressure;

(j) means for supplying fluid under pressure to said cavity for biasing said scroll members axially together; and (k) annular seal means disposed in said cavity, said seal means having first and second seals sealingly engaging said inner and outer wall surfaces, respectively, to isolate said pressurized fluid in said cavity from said *first and second* leakage [path] *paths*, said seal means being of a sandwich construction comprising a first annular element and a second annular element wherein said first and second seals comprise generally flat inner and outer annular lip seals clamped between said elements;

wherein one face of said seal means is exposed to the fluid in said cavity with said first seal isolating said cavity from said discharge pressure zone and said second seal isolating said cavity from the interior of said shell, the opposite face of said seal means being exposed to both the interior of said shell and to discharge pressure, said seal means [comprising] *engaging another component of said compressor to define* a third annular seal for isolating the interior of said shell from discharge pressure across said opposite face of said seal means said third seal surrounding said discharge fluid port.

43. A scroll compressor comprising:

(a) a hermetic shell;

(b) a discharge fluid port in a partition disposed in said shell;

(c) a hardened valve seat on said partition surrounding said discharge fluid port;

(d) an orbiting scroll member disposed in said shell and having a first spiral wrap on one face thereof;

(e) a non-orbiting scroll member in said shell and having a second spiral wrap on one face thereof, said wraps being intermeshed with one another;

(f) means for causing said orbiting scroll member to orbit about an axis with respect to said non-orbiting scroll member whereby said wraps will create pockets of progressively changing volume;

(g) means for mounting one of said scroll members for limited axial movement with respect to the other scroll member;

(h) means defining an annular cavity exposed to a surface of one of said scroll members which will cause pressurized fluid in said cavity to bias said one scroll member toward the other scroll member, said cavity having a radially inner wall surface and a radially outer wall surface;

(i) means defining a first fluid leakage path between said cavity and the interior of said shell;

(g) means defining a second fluid leakage path between said cavity and a zone in said shell at discharge pressure;

(k) means for supplying fluid under pressure to said cavity for biasing said scroll members axially together; and (l) annular seal means disposed in said cavity, said seal means having first and second seals sealingly engaging said inner and outer wall surfaces, respectively, to isolate said pressurized fluid in said cavity from said *first and second* leakage [path] *paths*, said seal means being of a sandwich construction comprising a first annular element and a second annular element wherein said first and second seals comprise generally flat inner and outer annular lip seals clamped between said elements;

wherein one face of said seal means is exposed to the fluid in said cavity with said first seal isolating said cavity from said discharge pressure zone and said second seal isolating said cavity from the interior of said shell, the opposite face of said seal means being exposed to both the interior of said shell and to discharge pressure, said seal means [comprising] *engaging another component of said compressor to define* a third annular seal for isolating the interior of said shell from discharge pressure across said opposite face of said seal means said third seal surrounding said discharge fluid port.

44. A scroll compressor comprising:

(a) a hermetic shell;

(b) a discharge fluid port in a partition disposed in said shell;

(c) a hardened valve seat on said partition surrounding said discharge fluid port, said valve seat being a separate annular member affixed to said partitions and surrounding said discharge fluid port;

(d) an orbiting scroll member disposed in said shell and having a first spiral wrap on one face thereof;

(e) a non-orbiting scroll member in said shell and having a second spiral wrap on one face thereof, said wraps being intermeshed with one another;

(f) means for causing said orbiting scroll member to orbit about an axis with respect to said non-orbiting scroll member whereby said wraps will create pockets of progressively changing volume;

(g) means for mounting one of said scroll members for limited axial movement with respect to the other scroll member;

(h) means defining an annular cavity exposed to a surface of one of said scroll members which will cause pressurized fluid in said cavity to bias said one scroll member toward the other scroll member, said cavity having a radially inner wall surface and a radially outer wall surface;

(i) means defining a first fluid leakage path between said cavity and the interior of said shell;

(j) means defining a second fluid leakage path between said cavity and a zone in said shell at discharge pressure;

(k) means for supplying fluid under pressure to said cavity for biasing said scroll members axially together; and (l) annular seal means disposed in said cavity, said seal means having first and second seals sealingly engaging said inner and outer wall surfaces, respectively, to isolate said pressurized fluid in said cavity from said *first and second* leakage [path] *paths*, said seal means being of a sandwich construction comprising a first annular element and a second annular element wherein said first and second seals comprise generally flat inner and outer annular lip seals clamped between said elements;

wherein one face of said seal means is exposed to the fluid in said cavity with said first seal isolating said cavity from said discharge pressure zone and said second seal isolating said cavity from the interior of said shell, the opposite face of said seal means being exposed to both the interior of said shell and to discharge pressure, said seal means [comprising] *engaging another component of said compressor to define* a third annular seal for isolating the interior of said shell from discharge pressure across said opposite face of said seal means said third seal surrounding said discharge fluid port.

45. A scroll compressor comprising:

(a) a hermetic shell;

(b) a discharge fluid port in a partition disposed in said shell;

(c) a hardened valve seat on said partition surrounding said discharge fluid port, said valve seat being a locally hardened surface on said partition surrounding said discharge fluid port;

(d) an orbiting scroll member disposed in said shell and having a first spiral wrap on one face thereof;

(e) a non-orbiting scroll member in said shell and having a second spiral wrap on one face thereof, said wraps being intermeshed with one another;

(f) means for causing said orbiting scroll member to orbit about an axis with respect to said non-orbiting scroll member whereby said wraps will create pockets of progressively changing volume;

(g) means for mounting one of said scroll members for limited axial movement with respect to the other scroll member;

(h) means defining an annular cavity exposed to a surface of one of said scroll members which will cause pressurized fluid in said cavity to bias said one scroll member toward the other scroll member, said cavity having a radially inner wall surface and a radially outer wall surface;

(i) means defining a first fluid leakage path between said cavity and the interior of said shell;

(j) means defining a second fluid leakage path between said cavity and a zone in said shell at discharge pressure;

(k) means for supplying fluid under pressure to said cavity for biasing said scroll members axially together; and (l) annular seal means disposed in said cavity, said seal means having first and second seals sealingly engaging said inner and outer wall surfaces, respectively, to isolate said pressurized fluid in said cavity from said *first and second* leakage [path] *paths*, said seal means being of sandwich construction comprising a first annular element having an annular axially extending rib and a second annular element formed of two annular parts disposed on opposite sides of said rib wherein said first and second seals comprise generally flat inner and outer annular lip seals clamped between said elements;

wherein one face of said seal means is exposed to the fluid in said cavity with said first seal isolating said cavity from said discharge pressure zone and said second seal isolating said cavity from the interior of said shell, the opposite face of said seal means being exposed to both the interior of said shell and to discharge pressure, said seal means [comprising] *engaging another component of said compressor to define* a third annular seal for isolating the interior of said shell from discharge pressure across said opposite face of said seal means said third seal surrounding said discharge fluid port.

46. A scroll compressor having a discharge zone at discharge pressure comprising:

(a) a hermetic shell;

(b) an orbiting scroll member disposed in said shell and having a first spiral wrap on one face thereof;

(c) a non-orbiting scroll member in said shell and having a second spiral wrap on one face thereof, said wraps being intermeshed with one another;

(d) means for causing said orbiting scroll member to orbit about an axis with respect to said non-orbiting scroll member whereby said wraps will create pockets of progressively changing volume;

(e) means for mounting one of said scroll members for limited axial movement with respect to the other scroll member;

(f) means defining an annular cavity exposed to a surface of one of said scroll members which will cause pressurized fluid in said cavity to bias said one scroll member toward the other scroll member, said cavity having a radially inner wall surface and a radially outer wall surface;

(g) means defining a first fluid leakage path between said cavity and the interior of said shell;

(h) means defining a second fluid leakage path between said cavity and a zone in said shell at discharge pressure;

(i) means for supplying fluid under pressure to said cavity for biasing said scroll members axially together; and (j) annular seal means disposed in said cavity, said seal means having first and second seals sealingly engaging said inner and outer wall surfaces, respectively, to isolate said pressurized fluid in said cavity from said *first and second* leakage [path] *paths*;

wherein one face of said seal means is exposed to the fluid in said cavity with said first seal isolating said cavity from said discharge pressure zone and said second seal isolating said cavity from the interior of said shell, the opposite face of said seal means being exposed to both the interior of said shell and to discharge pressure, said seal means [comprising] *engaging another component of said compressor to define* a third annular seal for isolating the interior of said shell from discharge pressure across said opposite face of said seal means said third seal surrounding said discharge fluid port.

47. A scroll compressor having a discharge zone at discharge pressure machine comprising:

(a) a hermetic shell;

(b) an orbiting scroll member disposed in said shell and having a first spiral wrap on one face thereof;

(c) a non-orbiting scroll member disposed in said shell and having a second spiral wrap on one face thereof, said wraps being intermeshed with one another;

(d) means for causing said orbiting scroll member to orbit about an axis with respect to said non-orbiting scroll member whereby said wraps will create pockets of progressively changing volume;

(e) means for mounting one of said scroll members for limited axial movement with respect to the other scroll member;

(f) means defining an annular cavity exposed to a surface on one of said scroll members which will cause pressurized fluid in said cavity to bias said one scroll member toward the other scroll member, said cavity having a radial inner wall surface and a radial outer wall surface;

(g) means defining a first fluid leakage path between said cavity and the interior of said shell;

(h) means defining a second fluid leakage path between said cavity and said discharge zone;

(i) means for supplying fluid under pressure to said cavity for biasing said scroll members axially together; and (j) annular seal means disposed in said cavity, said seal means having first and second seals sealingly engaging said inner and outer wall surfaces, respectively, to isolate said pressurized fluid in said cavity from said *first and second* leakage [path] *paths*;

wherein one face of said seal means is exposed to the fluid in said cavity with said first seal isolating said cavity from said discharge pressure zone and said second seal isolating said cavity from the interior of said shell, the opposite face of said seal means being exposed to both the interior of said shell and to discharge pressure, said seal means [comprising] *engaging another component of said compressor to define* a third annular seal for isolating the interior of said shell from discharge pressure across said opposite face of said seal means, said third seal being integral with said second element of said seal means.

*48. A scroll machine comprising:*

*(a) a hermetic shell;*

*(b) an orbiting scroll member disposed in said shell and having a first spiral wrap on one face thereof;*

*(c) a non-orbiting scroll member disposed in said shell and having a second spiral wrap on one face thereof, said spiral wraps being intermeshed with one another;*

*(d) means for causing said orbiting scroll member to orbit about an axis with respect to said non-orbiting scroll member whereby said wraps will create pockets of progressively changing volume between a suction pressure zone defining a suction pressure and a discharge pressure zone defining a discharge pressure;*

*(e) means defining a cavity disposed within one of said scroll members;*

*(f) means defining a fluid path between said discharge pressure zone and said suction pressure zone;*

(g) means for supplying intermediate pressurized fluid to said cavity, said intermediate pressurized fluid being at a pressure inbetween said suction and discharge pressures; and (h) seal means disposed in said cavity to isolate said intermediate pressurized fluid in said cavity whereby said seal means engages another component of said compressor to close said fluid path and said discharge pressure zone.

49. A scroll machine as claimed in claim 48 wherein said one scroll member is said non-orbiting scroll member.

50. A scroll machine as claimed in claim 48 wherein said seal means floats axially in said cavity between a first position wherein said seal means isolates fluid in said suction pressure zone from fluid in said discharge pressure zone and a second position wherein fluid in said discharge pressure zone is leaked to said suction pressure zone.

51. A scroll machine as claimed in claim 50 wherein said seal means is disposed in said first position under normal operating conditions.

52. A scroll machine as claimed in claim 50 wherein said seal means moves to said second position when the ratio between said discharge pressure and said suction pressure exceeds a predefined limit.

53. A scroll machine as claimed in claim 48 wherein said intermediate pressurized fluid reacts against a surface of said one scroll member to bias said one scroll member toward the other scroll member.

54. A scroll machine as claimed in claim 48 wherein said cavity is substantially defined by said non-orbiting scroll member.

55. A scroll machine as claimed in claim 48 including a leakage path between said cavity and said suction pressure zone.

56. A scroll machine as claimed in claim 48 wherein said seal means provides a first seal isolating said cavity from said discharge pressure zone, and a second seal isolating said cavity from said suction pressure zone, said engagement creating a third seal isolating said discharge pressure zone from said suction pressure zone.

57. A scroll machine comprising:

(a) a hermetic shell;

(b) an orbiting scroll member disposed in said shell and having a first spiral wrap on one face thereof;

(c) a non-orbiting scroll member disposed in said shell and having a second spiral wrap on one face thereof, said spiral wraps being intermeshed with one another;

(d) means for causing said orbiting scroll member to orbit about an axis with respect to said non-orbiting scroll member whereby said wraps will create pockets of progressively changing volume to compress a working fluid between a suction pressure zone defining a suction pressure and a discharge pressure zone defining a discharge pressure;

(e) means defining a cavity disposed within one of said scroll members;

(f) means defining a fluid path between said discharge pressure zone and said suction pressure zone;

(g) means for supplying said working fluid under pressure to said cavity; and (h) seal means disposed to move in said cavity between a first position wherein said seal means engages another component of said scroll machine to isolate said discharge pressure zone from said suction pressure zone and a second position in which a leakage of fluid in said discharge pressure zone into said suction pressure zone is permitted.

58. A scroll machine as claimed in claim 57 wherein said working fluid being supplied to said cavity is at a pressure intermediate said suction pressure and said discharge pressure.

59. A scroll machine as claimed in claim 57 wherein said seal means is disposed in said first position under normal operating conditions.

60. A scroll machine as claimed in claim 57 wherein the existence of a vacuum at the suction inlet of said compressor will cause said seal means to move from said first position to said second position.

61. A scroll machine as claimed in claim 57 wherein said pressurized fluid reacts against a surface of said one scroll member to bias said one scroll member toward the other scroll member.

62. A scroll machine as claimed in claim 57 wherein said cavity is exposed to a surface of said non-orbiting scroll member.

63. A scroll machine as claimed in claim 62 wherein said working fluid under pressure reacts against said surface to bias said non-orbiting scroll member toward said orbiting scroll member.

64. A scroll machine of claim 57 wherein said seal means floats axially in response to the ratio between said suction pressure and said discharge pressure.

65. A scroll compressor comprising:

(a) a hermetic shell;

(b) an orbiting scroll member disposed in said shell and having a first spiral wrap on one face thereof;

(c) a non-orbiting scroll member disposed in said shell and having a second spiral wrap on one face thereof, said spiral wraps being intermeshed with one another;

(d) means for causing said orbiting scroll member to orbit about an axis with respect to said non-orbiting scroll member whereby said wraps will create pockets of progressively changing volume to compress a working fluid between a suction pressure zone defining a suction pressure and a discharge pressure zone defining a discharge pressure zone;

(e) means defining a cavity disposed within one of said scroll members;

(f) means defining a leakage path between said discharge pressure zone and said suction pressure zone;

(g) means for supplying said working fluid to said cavity at a pressure intermediate said suction pressure and said discharge pressure; and (h) movable seal means disposed in said cavity for closing said leakage path by engaging another component of said compressor, said seal means being disposed under normal operating conditions of said compressor in a first position wherein said seal means isolates said discharge pressure zone from said suction pressure zone and wherein said seal means moves within said cavity to a second position wherein said fluid in said discharge pressure zone is leaked into said suction pressure zone when the ratio of said discharge pressure to said suction pressure exceeds a predefined limit.

66. A scroll machine as claimed in claim 65 wherein said working fluid being supplied to said cavity reacts against said scroll members to bias said scroll members together.

* * * * *

UNITED STATES PATENT AND TRADEMARK OFFICE

CERTIFICATE OF CORRECTION

PATENT NO. : Re. 35,216

DATED : April 23, 1996

INVENTOR(S) : Gary J. Anderson; James W. Bush

It is certified that error appears in the above-indentified patent and that said Letters Patent is hereby corrected as shown below:

Column 2, line 32, "fast" should be -- first --.

Column 2, line 53, after "9" insert -- . --.

Column 3, line 8, "comers" should be -- corners --.

Column 3, line 9, "comers" should be -- corners --.

Column 3, line 14, "beating" should be -- bearing --.

Column 3, line 15, "beating" should be -- bearing --.

Column 4, line 41, "east" should be -- cast --.

Column 4, line 62, "east" should be -- cast --.

Column 4, line 65, "101" should be -- 102 --

Column 6, line 5, "fast" should be -- first --.

Column 6, line 7, "FIG." should be -- FIGS. --.

Column 6, line 46, "123" should be -- 125 --.

UNITED STATES PATENT AND TRADEMARK OFFICE

CERTIFICATE OF CORRECTION

PATENT NO. : Re. 35, 216 Page 2 of 2

DATED : April 23, 1996

INVENTOR(S) : Gary J. Anderson; James W. Bush

It is certified that error appears in the above-indentified patent and that said Letters Patent is hereby corrected as shown below:

Column 9, line 3, "scaling" should be -- sealing --.

Column 11, line 55, "paths" should be --[path] paths--

Column 13, line 20, "(g)" should be -- (j) --.

Column 16, line 5, "machine" should be deleted.

Signed and Sealed this

Twenty-fifth Day of February, 1997

*Attest:*

Bruce Lehman

BRUCE LEHMAN

*Attesting Officer*

*Commissioner of Patents and Trademarks*